MERRILL P. ROBINSON
INVENTOR.

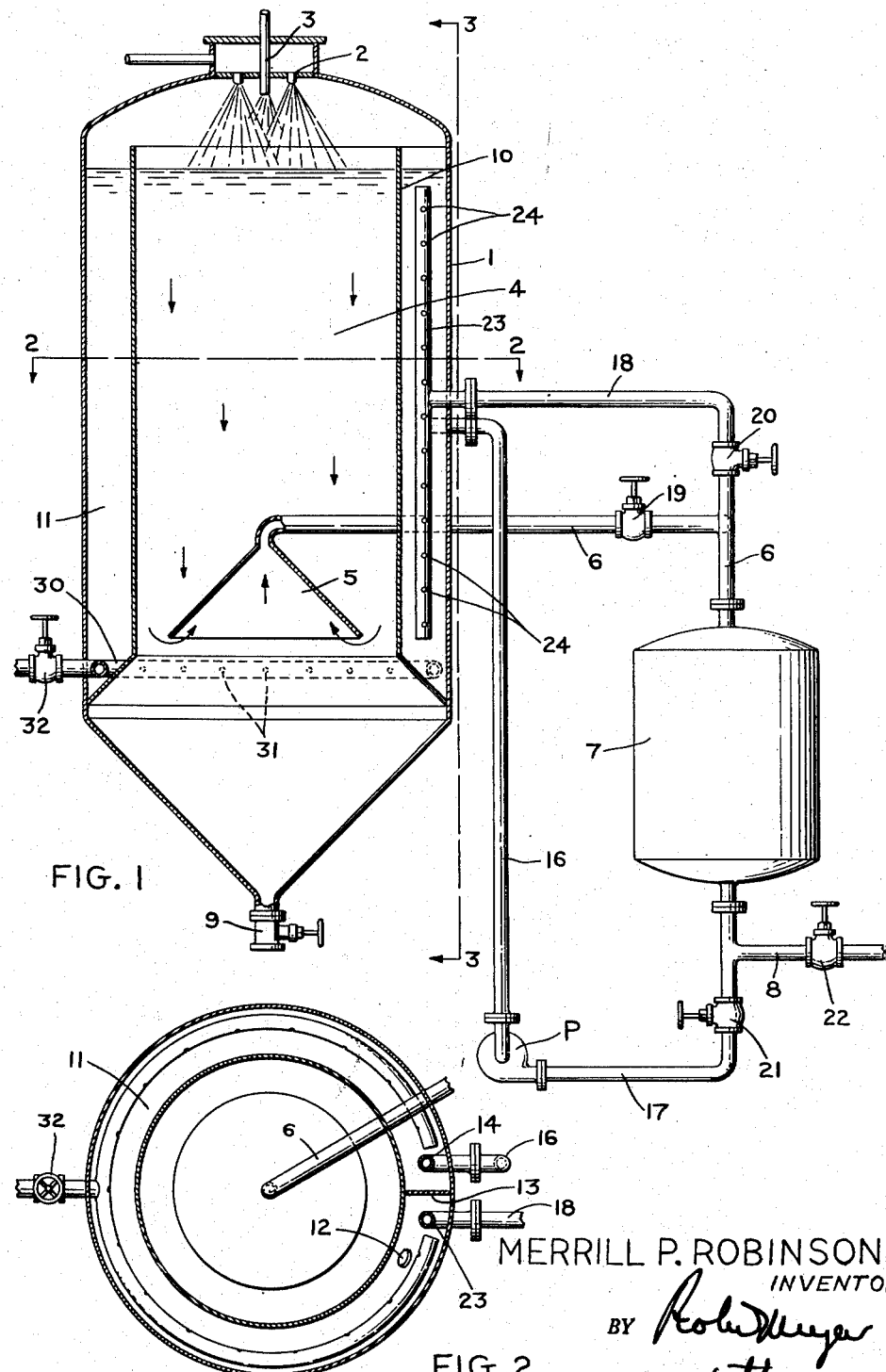

Patented Apr. 13, 1954

2,675,350

UNITED STATES PATENT OFFICE 2,675,350

WATER TREATING APPARATUS

Merrill P. Robinson, Upper Montclair, N. J., assignor to Worthington Pump and Machinery Corporation, Harrison, N. J., a corporation of Delaware Application July 2, 1951, Serial No. 234,730

2 Claims. (Cl. 210—16)

This invention relates to water treating apparatus and more particularly to an improved method and apparatus for backwashing a filter used in connection with a precipitating type of apparatus employed in water softening.

Due to the impracticability of settling out all of the precipitate or other turbidities which occur in well known processes of removing dissolved hardness from water by the application of a suitable precipitating reagent, a filter is commonly used for final clarification of the water.

The precipitate or other turbidities filtered out must be periodically removed from the filter to maintain the friction through the filter within suitably low limits and for hydraulically regrading the granular filter bed material.

It is desirable that the back washing operation of the filter be carried on independently of the softening process to avoid turbulating water under treatment in the softening apparatus, and it is also desirable that no water be lost in the process of backwashing and that the filter be backwashed with clear water.

To meet these conditions an annular backwash reclamation compartment is provided to supply clear filter backwash water while simultaneously receiving turbid water returned thereto from the filter which backwash compartment is designed with suitably volumetric capacity so that the filter backwashing operation is completed before the returned turbid water reaches a point for return to the filter, i. e., reaches the suction to the recirculating pump. The turbid water returned to the backwash compartment reclarifies itself by sedimentation.

Such an annular compartment is shown and described in prior Patent No. 2,263,398, issued November 18, 1941, wherein the returned turbid water is directed horizontally and tangentially to the walls of the annular compartment so that the resulting rotation of the body of water in the compartment forces the turbidity to travel in a spiral path on its upward progress from the return nozzle located near the bottom of the compartment to the recirculating pump suction connection located near the top of the compartment.

The present invention relates to improved means for recirculating the water in a manner approaching laminar flow, the travel of the water being in a horizontal direction so that perforated vertical straight pipe suction and discharge headers may be used to insure uniform distribution, the headers being separated by a baffle or partition extending the full height of the annular wash water compartment.

With these and other objects in view, as may appear from the accompanying specification, the invention consists of various features of construction and combination of parts, which will be first described in connection with the accompanying drawings, showing a water treating apparatus of a preferred form embodying the invention, and the features forming the invention will be specifically pointed out in the claims.

In the drawings:

Figure 1 is a vertical section through the water treating apparatus showing the improved wash water compartment and filter backwash means associated therewith.

Figure 2 is a horizontal section taken on the line 2—2 of Figure 1.

Figure 3:
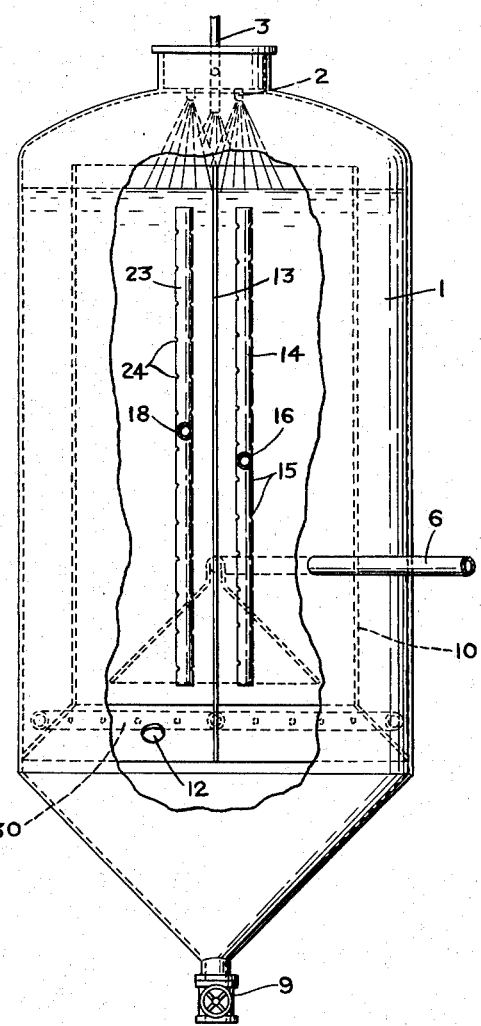
Figure 3 is a side elevation of the water treating apparatus having parts of the outer shell thereof broken away.

Referring more particularly to the drawings, 1 indicates the receptacle or tank of a chemical water softening or treating apparatus into which water is fed from suitable inlet nozzles 2 and into which chemical is delivered from a chemical nozzle 3. As is usual in such types of apparatus, the chemical and water mixes in the reaction and settling chamber 4 and the treated water flows through the uptake cone 5 through the pipe 6 and through a filter 7 containing a filter bed of any approved material and thence to the point of use from the filter 7 through a pipe or conduit 8. The precipitate settles in the bottom of the receptacle 1 and is drawn off through a sludge outlet 9.

The present invention embraces an annular partition 10 placed within the receptacle 1 and spaced from the walls of the receptacle to form an annular wash water compartment 11 similar to that disclosed in my prior Patent No. 2,263,398. However, the present invention differs from said patent by providing means for a substantially laminar flow of backwash water within the compartment 11. The compartment 11 is provided with an opening in the bottom thereof as is indicated at 12 for initially filling the compartment 11 and thereafter to provide means for equalizing the water level in compartment 11 with the water level in the reaction and settling chamber 4. A partition 13 is provided in the annular wash water compartment 11 which partition extends from the bottom to the top of the wash water compartment as clearly shown in Figures 2 and 3 of the drawings. A header 14 extends vertically in the wash water compartment 11 on one side of the partition 13 and it is provided with a plurality of vertically spaced openings 15 through which water enters the header from the wash water compartment. The water from the header 14 is taken by the backwash pump P through the conduits 16 and 17 and flows through the filter 7 in a reverse direction to the normal flow of water through the filter. The backwash water leaves the filter through the normal inlet conduit 6 and through the return conduit 18 when the valve 19 is closed and the valve 20 is opened. A valve 21 is placed in the pipe 17 to control backflow of water through the filter and a valve 22 is placed in the outlet pipe to prevent the backflowing water from flowing to the source of use of the treated water. A header 23 is connected to the outlet end of the pipe 18 and it extends vertically in the annular wash water compartment 11 on the opposite side of the partition 13 from the header 14. The header 23 has a plurality of vertically spaced openings 24 therein opening out into the annular wash water compartment so that the water being recirculated during the process of backwashing the filter 7 will flow in a plurality of vertically spaced streams back into the annular wash water compartment. The precipitate or sediment picked up by the backwash water as it flows through the filter 7 will settle out and fall to the bottom of the wash water compartment 11.

A sediment blow-off ring 30 is mounted in the lowermost portion of the wash water compartment 11 and comprises an annular tubular ring having a plurality of spaced outlet openings 31. A valve 32 is provided for controlling the flow of water through the sediment blow-off ring 30.

The provision of the openings 15 and 24 in the header pipes 14 and 23 induces uniform horizontal flow in the wash water compartment 11 and utilizes the volumetric clear water content of the wash water compartment 11 to a very high degree. When the backwashing operation is finished the backwash pump P is stopped and the valves 21 and 20 closed at which time the valves 19 and 22 are opened. The water returned to the annular wash water compartment 11 remains quiescent during such time as the valves 20 and 21 are closed and any turbidity returned to the wash water compartment 11 from the filter 7 will settle and render all of the water in the compartment clear whereupon it will again be suitable for backwash purposes.

It will be understood that the invention is not to be limited to the specific construction or arrangement of parts shown, but that they may be widely modified within the invention defined by the claims.

What is claimed is:

1. Water treating apparatus comprising a receptacle having a chemical reaction and settling chamber therein, means for delivering raw water to said chamber, means for delivering chemicals to said chamber, said chamber having an outlet for treated water, an annular partition in said receptacle forming an annular wash water compartment, said partition having its lower end flared and attached to the inner wall of said receptacle, a partition in said wash water compartment and extending throughout the height of the wash water compartment to prevent circular flow of water completely around the compartment, a water outlet header at one side of said partition and extending longitudinally in the compartment, said outlet header provided with a plurality of longitudinally spaced openings to provide equalized outlet flow of water throughout the compartment, a water inlet header in said compartment at the side of said partition opposite said water outlet header, said inlet header provided with a plurality of longitudinally spaced openings to provide equalized laminar flow of water into the compartment.

2. Water treating apparatus as claimed in claim 1 wherein said flared lower end of said partition is provided with a relatively small opening establishing communication between said wash water compartment and said chamber to permit initial filling of the compartment and equalization of water levels in the compartment and chamber.

References Cited in the file of this patent

UNITED STATES PATENTS

| Number | Name | Date |
| --- | --- | --- |
| 1,624,382 | Bartlett | Apr. 12, 1927 |
| 2,101,908 | Zoos et al. | Dec. 14, 1937 |
| 2,204,062 | Applebaum | June 11, 1940 |
| 2,263,398 | Robinson | Nov. 18, 1941 |
| 2,379,753 | Sebald | July 3, 1945 |
| 2,467,003 | Bach | Apr. 12, 1949 |
| 2,523,523 | Robinson et al. | Sept. 26, 1950 |